United States Patent
Harnisch et al.

(10) Patent No.: US 7,148,446 B2
(45) Date of Patent: Dec. 12, 2006

(54) METHOD AND APPARATUS FOR LASER CUTTING SHEET METAL PARTS

(75) Inventors: Gunter Harnisch, Königsbrück (DE); Rolf Herrmann, Sohland (DE); Andreas Hultsch, Neukirch (DE); Harry Thonig, Neukirch (DE)

(73) Assignee: Trumpf Sachsen GmbH, Neukirch (DE)

( * ) Notice: Subject to any disclaimer, the term of this patent is extended or adjusted under 35 U.S.C. 154(b) by 557 days.

(21) Appl. No.: 10/671,161

(22) Filed: Sep. 25, 2003

(65) Prior Publication Data

US 2004/0108305 A1 Jun. 10, 2004

(30) Foreign Application Priority Data

Sep. 28, 2002 (DE) ................ 102 45 371

(51) Int. Cl.
*B23K 26/14* (2006.01)
*B23K 26/16* (2006.01)

(52) U.S. Cl. ............................. 219/121.67; 219/121.66
(58) Field of Classification Search ........... 219/121.67, 219/121.66, 121.85, 121.6
See application file for complete search history.

(56) References Cited

U.S. PATENT DOCUMENTS

| 4,040,318 | A | * | 8/1977 | Makeev et al. ............... 83/76.8 |
| 4,815,349 | A | * | 3/1989 | Urs ............................. 83/404 |
| 6,563,081 | B1 | | 5/2003 | Pace |
| 2002/0084259 | A1 | * | 7/2002 | Bertuzzi et al. ........ 219/121.39 |

FOREIGN PATENT DOCUMENTS

| DE | 28 35 476 B1 | 1/1980 |
| DE | 40 20 839 A1 | 4/1991 |

* cited by examiner

*Primary Examiner*—M. Alexandra Elve

(57) ABSTRACT

Method and device for cutting out sheet metal blanks preferably from a coil of a thin sheet metal strip, with stepped uncoiling and straightening of the metal strip in the longitudinal direction of the device on a processing platform.

15 Claims, 1 Drawing Sheet

METHOD AND APPARATUS FOR LASER CUTTING SHEET METAL PARTS

BACKGROUND OF THE INVENTION

Figure 1:
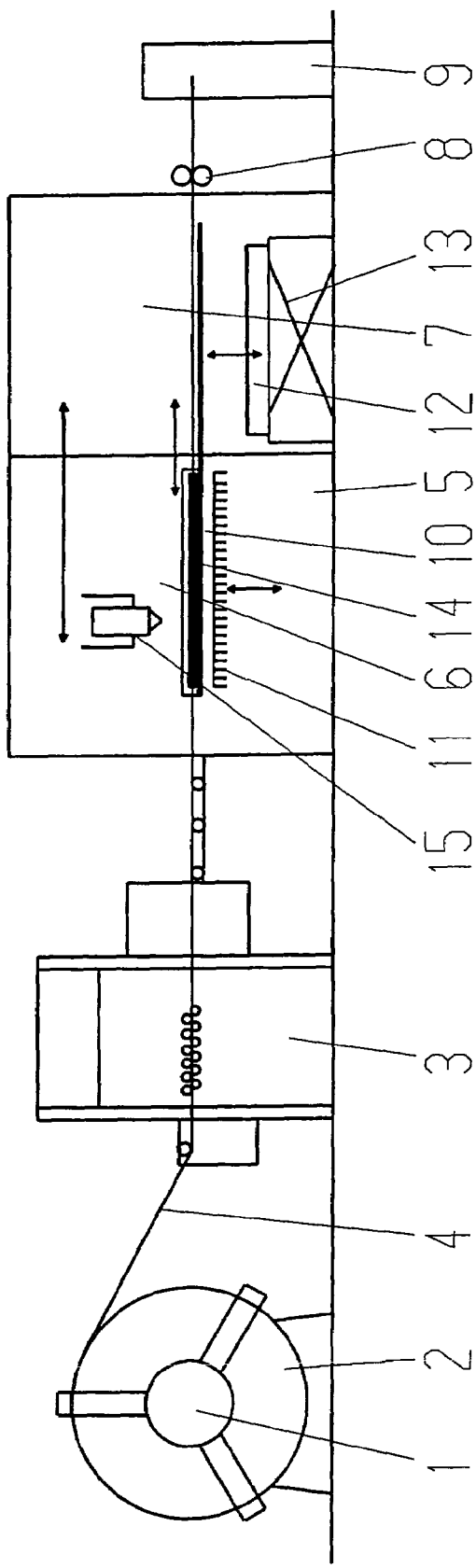

This invention relates to a method and apparatus for cutting parts from thin sheet metal in a laser cutting machine, and the thin sheet metal may be in coiled form.

German Patent DE 28 35 476 B1 describes a device for feeding a sheet metal strip from a coil into a metal processing machine such as a punch or stamping press, with a coil-carrying reel followed by feed and straightening rollers for the metal strip being uncoiled. The metal strip is uncoiled in a stepwise fashion, and its advance is controlled by means of a pressure spindle bearing on the strip and by a reel brake pressing against the coil direction. In a similar context, German Patent Publication DE 40 20 839 describes the cutting of the uncoiled metal strip into stackable blanks that are fed into a pressing tool. In that case, the sheet metal strip is placed in a pressing die, and particularly careful handling of the blank's surface does not appear to be necessary.

For cutting sheet metal blanks from coiled material by means of a laser, U.S. Pat. No. 6,563,081 describes the continuous unrolling of the coil, straightening the metal strip and feeding the straightened strip underneath and through a bridge upon which a focusing head is mounted for motion crosswise relative to the direction of travel of the metal strip. To permit a reverse movement of the strip for the cutting of complex patterns, an intermediate compartment allows the strip to sag in a loop when it is retracted from the processing platform. However, the intermediate compartment limits the reverse movement capability of the strip. This constant reciprocal movement of the metal strip on the processing platform makes surface scratching of the strip inevitable. There is also a risk that, as partly cut blanks move backward, they can dip into the longitudinal channel and are either bent out of shape or cause a jam.

Without identifying the source, U.S. Pat. No. 6,563,081 refers to a "known" prior art technique wherein the metal strip is uncoiled in stepwise fashion or the individual blanks are placed on a processing platform. In a fixed head unit, teeth grip the strip along its edges and guide it under the head by means of articulated arms. Alternatively, the focusing head is moved in two axial directions as the metal strip is advanced in stepwise fashion and placed on the processing platform. The drawback here is that larger blanks which protrude beyond the processing platform cannot be cut, some cut blanks are lost, and removing the toxic smoke requires a complex system.

It is the object of this invention to provide a novel method and apparatus for cutting sheet metal blanks from a coiled thin metal strip which is advanced in stepwise fashion, without any blanks being jammed, scratched or lost.

It is also an object to provide such a method and apparatus which can be used to process separate flat plates.

Another object is to provide a method and apparatus which is easy to operate and adjust for producing different blanks.

SUMMARY OF THE INVENTION

It has now been found that the foregoing and related objects may be readily attained in a method for cutting sheet metal blanks from a coil of thin sheet metal which the metal strip is initially uncoiled and straightened in the longitudinal direction in a stepwise manner. The metal strip is gripped in a lateral clamping frame above a processing platform, following which the clamped metal strip is initially cut in a cutting position to leave only residual webs that hold the blanks in the residual strip. The metal strip is then moved while still clamped into a depositing position above a depositing platform, and the webs are cut to free the blanks. The cut blanks are stacked in sorted fashion on the platform, following which the clamping elements are released and the clamping frame is returned to its initial position. The residual metal skeleton is conveyed from the depositing position for disposal.

Initially, the leading end of the thin metal strip is unrolled from the coil and advanced between the clamping elements of the clamping frame in the longitudinal direction. The strip gripped by the clamping frame is then tensioned in the transverse direction relative to the feed direction, and the supporting processing platform is moved upwardly against the metal strip. After the clamping elements are released following the second cutting operation and to initiate the subsequent operation, the released clamping elements of the returning clamping frame slide into the cutting position past the cut strip and into their home position.

The metal strip is also advanced beyond the depositing position to pull-out rollers which tension the metal strip in the longitudinal direction.

Generally, the cutting steps are effected by a laser cutting head(s), and the initially cut metal strip and the cutting head(s) are moved into the depositing position where the cutting head(s) that performed the initial cutting sever the remaining webs.

Preferably, the cutting head(s) is/are guided along a curved path in noncritical locations in terms of the dimensional stability of the blank concerned to sever the webs that hold the blanks in the metal strip. The clamping frame holding the metal strip, and the empty clamping frame, is moved into the depositing position and back to the cutting position by means of cams that are connected to a guide system for the cutting head(s).

The method and apparatus can be adapted to process separate plates by placing the plates on the processing platform where it is gripped in the clamping frame, following which it is processed in substantially the same manner as the metal strip.

The cutting apparatus for cutting the sheet metal blanks from a coil of thin sheet metal comprises a reel for holding a coil of sheet metal and a strip straightening and alignment unit. The cutting machine has a cutting head, a cutting platform and a depositing platform. Pull-out rollers are provided on the downstream side of the cutting apparatus to pull the strip through the apparatus, and a strip disposal unit collects the residual metal strip.

The cutting machine has a worktable in the cutting position equipped with a suction device and supporting a processing platform for supporting the uncoiled metal strip. An elevating table is located in the depositing position and supports the depositing platform. The elevating table is lowered to adapt to the deposited blanks. A clamping frame grips the metal strip, tensions it and holds it in the transverse direction relative to its travel direction. The clamping frame is reciprocable between the cutting position and the depositing position.

Desirably, the clamping elements on the clamping frame can be moved relative to each other by means of compressed air-operated inflatable tubes and that, in the transverse direction relative to its travel direction the clamping frame can be clamped by compressed air cylinders within a finite range. The depositing platform may include receptacles for receiving the blanks, it may include a conveyor system for transporting the blanks emanating from the cutting machine.

Conveniently, the cutting head is reciprocable between the cutting position and the depositing position, by a cam driven by the cutting head during its movement and engaging the clamping frame to effect its movement. The clamping frame is connected to a positional measuring system that detects deviations from a setpoint position and corrects a positional control for the cutting head(s) for proper alignment of the cutting head with the strip after its movement from the cutting position to the depositing position.

In the method for cutting out sheet metal blanks from a coiled thin metal strip or from metal plates placed on a processing platform, the process begins with a clamping frame, located on the side of the metal strip, gripping the strip above the processing platform and clamping it in a cutting position. On that platform the blanks are cut to the point where only thin webs, preferably located in noncritical places in terms of dimensional stability of the blank concerned, hold the blanks together in the strip. While still clamped, the blank thus precut is moved to a point above a depositing platform next to the cutting platform. There, in a second operation, the webs are cut, allowing the blanks to drop from the remaining strip for collection on the depositing platform. As the process is repeated, identical blanks are cut out and stacked in the same position on the depositing platform. The depositing platform is lowered and is adapted to the thickness of the sheet metal. The remaining skeleton strip is advanced outwardly of the device for appropriate disposal.

For inserting the leading end of the thin sheet metal strip to be uncoiled into the device, the clamping frame is moved into the cutting position, the metal strip is advanced by a drive-equipped reel and/or straightening system and pushed between the clamping elements of the clamping frame where, upon completion of this step, it is gripped and tensioned in the direction transverse to the feed direction. Following cutting, the clamping frame with the thin sheet metal strip is moved into the depositing position. Pull-out rollers then grip the metal strip for further stepwise uncoiling. After removal of the blanks, the clamping frame is released and moves back into the cutting position to initiate the next cutting operation.

If metal plates are to be processed, these are placed in the cutting position on the processing platform, which lifts them to the level of the clamping frame. The clamping frame moves from the depositing position into the cutting position, grips the edge of the plate between its clamping elements which, clamps and holds the metal plate.

The device for implementing the method for cutting sheet metal blanks consists of an essentially conventional reel on which the thin metal strip is coiled. Following the reel is a conventional straightening unit for the uncoiled strip. Directly following the straightening unit is a cutting machine that is provided, in the feed direction of the metal strip, with a cutting platform and a depositing platform. On the exit side of the cutting machine are pull-out rollers and a disposal unit that cuts up the residual strip. Located in the cutting position is a conventional work support table that supports a processing platform which is equipped with a suction device that can be raised to the processing level to support the uncoiled strip or, as appropriate, to lift the metal plates.

Located in the depositing position is an elevating table that supports the depositing platform and can be lowered to adapt to the stacked blanks.

The clamping frame moves between the cutting position and the depositing position. The clamping elements of the clamping frame that grip the edges of the metal strip can be moved toward each other by compressed air-operated inflatable tubes. The horizontal clamping of the metal strip in the transverse direction relative to the movement of the clamping frame is accomplished by means of compressed air cylinders that operate within a finite range.

The clamping frame is equipped with a positional measuring unit that detects deviations of the clamping frame after its movement from the cutting position to the depositing position and sends corresponding signals for an appropriate positional correction of the cutting head in order to attain the setpoint position of the blanks.

BRIEF DESCRIPTION OF THE ATTACHED DRAWING

The following description of an implementation example will explain this invention in more detail.

FIG. 1 is a schematic elevational view of a device for cutting sheet metal blanks embodying the present invention.

DETAILED DESCRIPTION OF THE ILLUSTRATED EMBODIMENT

FIG. 1 diagrammatically illustrates a laser cutting machine embodying the present invention for cutting sheet metal blanks from strip. The machine includes a reel 1 that holds a coil 2 of thin sheet metal strip material which is followed by a straightening unit 3 for straightening the uncoiled metal strip 4. The straightening unit 3 is directly followed by a cutting machine 5. In the feed direction of the metal strip 4, the cutting machine 5 has a cutting platform 6 and a depositing platform 12 in a depositing position 7. The cutting machine 5 is followed by pull-out rollers 8 that tension the strip 4 in the longitudinal direction and serve to advance the strip 4, and a disposal unit 9 that cuts up the residual skeleton strip 4.

Located in the cutting position 6 are a work table 11 that supports a processing platform 10 and a suction unit (not shown) that can be raised against the metal strip 4 up to the processing level (as indicated by an arrow) to support the uncoiled strip 4. Located in the depositing position 7 is an elevatable table 13 (movable as indicated by an arrow) that supports the depositing platform 12 and can be raised or lowered to adapt to the stacked blanks. Slidable at the processing level between the cutting position 6 and the depositing position 7 is a clamping frame 14, movable as indicated by a double arrow above it. This is engaged by a cam on a gantry (not illustrated) and is moved with the metal strip 4 into the depositing position 7 and back, as indicated by the double arrow, between the depositing position 7 and the cutting position 6 of the movable cutting head 6.

The clamping frame 14 features clamping elements that grip the edges of the sheet metal. To that effect, the clamping elements can be moved toward each other by compressed air-operated inflatable tubes. In the transverse direction relative to the direction of travel, the strip 4 is tensioned by compressed air cylinders that operate within a finite range. The clamping frame 14 is equipped with a positional measuring unit (not shown) that serves to detect deviations of the clamping frame 14 from a desire position after it has moved from the cutting position 6 into the depositing position. The measuring unit sends appropriate signals for the positional correction of the cutting head 15 so that it is disposed in a setpoint position on the blanks.

To process separate plates, these are placed on the processing platform where they are gripped by the clamping frame following which they are processed similarly to the strip.

Thus, it can be seen from the foregoing detailed description and drawing that the novel method and apparatus is simple to construct, easy to operate and adaptable to process strip or separate plates.

The invention claimed is:

1. In a method for cutting sheet metal blanks from a coil of thin sheet metal strip:
    (a) uncoiling and straightening the metal strip in the longitudinal direction in a stepwise manner;
    (b) gripping the metal strip above a processing platform (10) in a lateral clamping frame (14) having clamping elements;
    (c) initially cutting the clamped metal strip in a cutting position (6) to leave only residual webs that hold the blanks in the residual strip (4);
    (d) moving the metal strip (4) while still clamped into a depositing position (7) above a depositing platform (12);
    (e) cutting the webs to free the blanks and stacking the blanks in sorted fashion on the platform (12);
    (f) releasing the clamping elements and returning the clamping frame (14) to its initial position; and
    (g) thereafter conveying the residual metal strip (4) from the depositing position (7) for disposal.

2. The method for cutting sheet metal blanks in accordance with claim 1 wherein initially the leading end of the thin metal strip (4) initially is unrolled from the coil (2) and advanced between the clamping elements of the clamping frame (14) in the longitudinal direction; wherein the strip, gripped by the clamping frame (14) is tensioned in the transverse direction relative to the feed direction; wherein the supporting processing platform (10) is moved upwardly against the metal strip; and wherein, after the clamping elements are released following the second cutting operation and to initiate the subsequent operations, the released clamping elements of the returning clamping frame (14) slide into the cutting position (6) past the strip (4) and into their home position.

3. The method for cutting out sheet metal blanks in accordance with claim 2 wherein the metal strip is advanced from the depositing position (7) between pull-out rollers which tension the metal strip (4) in the longitudinal direction.

4. The method for cutting sheet metal blanks in accordance with claim 1 wherein the cutting steps are effected by a laser cutting head(s) and wherein the initially cut metal strip (4) and the cutting head(s) (15) are moved from the cutting position to the depositing position (7) at which the cutting head(s) (15) that performed the initial cutting sever the remaining webs.

5. The method for cutting sheet metal blanks in accordance with claim 4 wherein the cutting head(s) (15) is/are guided along a curved path to sever the webs that hold the blanks in the metal strip (4) in noncritical locations in terms of the dimensional stability of the blanks.

6. The method for cutting sheet metal blanks in accordance with claim 5 wherein that the clamping frame (14) holding the metal strip (4) as well as the empty clamping frame (14) are moved into the depositing position (7) and back to the cutting position (6) by means of cams that are connected to a guide system for the cutting head(s).

7. The method for cutting sheet metal blanks in accordance with claim 1 wherein a positional measuring system detects deviations of the strip from a setpoint position and corrects a positional control for the cutting head (15) to provide proper alignment of the cutting head (15) with the strip (4) after its movement from the cutting position to the depositing position.

8. In a method for cutting sheet metal blanks from plates, the steps comprising:
    (a) gripping a metal plate above a processing platform (10) in a lateral clamping frame (14);
    (b) initially cutting the clamped metal plate in a cutting position (6) to leave only residual webs that hold blanks in the residual plate (4);
    (c) moving the metal plate (4) while still clamped into a depositing position (7) above a depositing platform (12);
    (d) cutting the webs to produce free blanks and stacking the blanks in sorted fashion in the platform (12);
    (e) releasing the clamping elements and returning the frame (14) to its initial position; and
    (f) thereafter conveying the residual metal plate (4) from the depositing position (7) for disposal.

9. The method for cutting sheet metal blanks in accordance with claim 8 wherein the cutting steps are effected by a laser cutting head(s) and wherein the initially cut metal strip (4) and the cutting head(s) (15) are moved into the depositing position (7) at which the cutting head(s) (15) that performed the initial cutting sever the remaining webs.

10. A cutting apparatus for cutting sheet metal blanks from a coil of thin sheet metal strip comprising:
    (a) a reel (1) for holding a coil (2) of sheet metal;
    (b) a strip straightening and alignment unit (3);
    (c) a cutting machine (5) with a cutting head (15), a processing platform (6) and a depositing platform (7);
    (d) pull-out rollers (8) on the downstream side of said cutting machine;
    (e) a strip disposal unit (9) that collects the residual metal strip (4), said cutting machine having a worktable (11) in the cutting position (6) equipped with a suction device and supporting a processing platform (10) for supporting the uncoiled metal strip (4);
    (f) an elevating table (13) located in the depositing position (7) supporting a depositing platform (12), said elevating table being lowered to adapt to the deposited blanks; and
    (g) a clamping frame (14) that grips the metal strip (4), tensions it and holds it in the transverse direction relative to its travel direction, said clamping frame being movable between the cutting position (6) and the depositing position (7).

11. The cutting apparatus in accordance with claim 10 wherein clamping elements on the clamping frame (14) can be moved relative to each other by means of compressed air-operated inflatable tubes, and wherein, the transverse direction relative to its travel direction, the clamping frame (14) can be clamped by compressed air cylinders within a finite range.

12. The cutting apparatus in accordance with claim 10 wherein the depositing platform (7) includes receptacles for receiving the blanks.

13. The cutting apparatus in accordance with claim 10 wherein the depositing platform (7) includes a conveyor system for transporting the blanks emanating from the cutting machine.

14. The cutting apparatus in accordance with claim 10 wherein said cutting head (15) is reciprocable between the cutting position (6) and the depositing position (7), said apparatus including a cam driven by the cutting head (15) during its movement and engaging the clamping frame (14) to effect its movement.

15. The cutting apparatus in accordance with claim 10 wherein the clamping frame (14) is connected to a positional measuring system that detects deviations in the position of the strip (4) from a setpoint position and corrects the positional control of the cutting head(s) (15) to properly align the cutting head (15) with the strip (4) after its movement from the cutting position (6) to the depositing position (7).

* * * * *